United States Patent
Lee et al.

(10) Patent No.: US 8,754,879 B2
(45) Date of Patent: Jun. 17, 2014

(54) DISPLAY APPARATUS AND POWER CIRCUIT DEVICES THEREOF

(75) Inventors: Jung-seob Lee, Hwaseong-si (KR); Sang-hoon Lee, Suwon-si (KR); Tae-hoon Kim, Suwon-si (KR); Agarwal Pankaj, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 316 days.

(21) Appl. No.: 13/237,370

(22) Filed: Sep. 20, 2011

(65) Prior Publication Data

US 2012/0068982 A1 Mar. 22, 2012

(30) Foreign Application Priority Data

Sep. 20, 2010 (KR) .................. 10-2010-0092448

(51) Int. Cl.
*G09G 5/00* (2006.01)
*G06F 3/038* (2013.01)
*G05F 1/00* (2006.01)
*H05B 37/02* (2006.01)
*H05B 39/04* (2006.01)
*H05B 41/36* (2006.01)

(52) U.S. Cl.
USPC .......................... 345/208; 315/291

(58) Field of Classification Search
USPC ............................................. 315/246
See application file for complete search history.

(56) References Cited

U.S. PATENT DOCUMENTS

| | | | |
|---|---|---|---|
| 4,580,080 A * | 4/1986 | Smith | 315/199 |
| 7,414,371 B1 * | 8/2008 | Choi et al. | 315/291 |
| 7,852,641 B2 * | 12/2010 | Kim et al. | 363/21.14 |
| 2004/0080962 A1 | 4/2004 | Charych | |
| 2007/0013620 A1 | 1/2007 | Tanahashi et al. | |
| 2007/0296354 A1 | 12/2007 | Okabe | |

OTHER PUBLICATIONS

Communication, dated Sep. 29, 2011, issued by the European Patent Office in corresponding European Application No. 11168305.8.
Communication, dated Jul. 26, 2013, issued by the European Patent Office in counterpart European Application No. 11 168 305.8.

* cited by examiner

*Primary Examiner* — Kent Chang
*Assistant Examiner* — Nathan Brittingham
(74) *Attorney, Agent, or Firm* — Sughrue Mion, PLLC (57) ABSTRACT

A display apparatus and a power circuit device thereof are provided. The power circuit device includes: a transforming unit which outputs a first output current and a second output current in response to change of an input current; a first switching unit which switches to allow the input current to be selectively input; a first switch control unit which controls the first switching unit so that an operation voltage of the display apparatus reaches a first target value; a second switching unit which switches to allow the second output current to be selectively output; a backlight driving unit which drives the backlight based on the second output current; and a second switch control unit which controls the second switching unit so that a driving voltage of the backlight reaches a second target value.

16 Claims, 6 Drawing Sheets

DISPLAY APPARATUS AND POWER CIRCUIT DEVICES THEREOF

CROSS-REFERENCE TO RELATED APPLICATION

This application claims priority from Korean Patent Application No. 10-2010-0092448, filed on Sep. 20, 2010 in the Korean Intellectual Property Office, the disclosure of which is incorporated herein by reference.

BACKGROUND

1. Field

Apparatuses consistent with exemplary embodiments relate to a display apparatus and a power circuit device thereof, and more particularly, to a display apparatus including a backlight as a light source, and a power circuit device which drives the backlight.

2. Description of the Related Art

A display apparatus such as a television (TV), a computer monitor or the like may include a backlight, such as light emitting diodes (LEDs), as a light source for display of an image. A power circuit is required to drive such a backlight.

A related art backlight power circuit may include, for example, a flyback-type converter which supplies all of the power, a post-regulator which receives an output voltage of the converter as an input and outputs a voltage adapted for a backlight, and a backlight driver which drives the backlight by controlling the output voltage of the post-regulator to be a constant current.

In such a related art configuration, if the output voltage of the converter is not fixed but instead varies depending on a load of other element and a load of the backlight, the post-regulator is nearly unavoidably used, meaning that it is an essential element, which results in increased costs and lower efficiency.

SUMMARY

One or more exemplary embodiments provide a display apparatus and a power circuit device thereof, which are capable of reducing costs and increasing efficiency by removing a post-regulator from a power circuit which supplies an operating voltage and a driving voltage of a backlight.

According to an aspect of an exemplary embodiment, there is provided a power circuit device which drives a backlight included in a display apparatus, the power circuit device including: a transforming unit which outputs a first output current and a second output current in response to change of an input current; a first switching unit which switches to allow the input current to be selectively input; a first switch control unit which controls the first switching unit so that an operation voltage of the display apparatus by the first output current can reach a first target value; a second switching unit which switches to allow the second output current to be selectively output; a backlight driving unit which drives the backlight based on the second output current; and a second switch control unit which controls the second switching unit so that a driving voltage of the backlight by the second output current can reach a second target value.

The transforming unit may include: a primary coil which receives the input current; a secondary main coil which outputs the first output current; and a secondary auxiliary coil which outputs the second output current.

The second switch control unit may control the second switching unit to intercept the second output current before the second output current is fully discharged.

The second switch control unit may include: an error amplifier which outputs an error signal which is a difference between a feedback signal of the driving voltage of the backlight and a predefined reference signal; a ramp signal generating part which generates a ramp signal; and a comparing part which compares the error signal with the ramp signal and outputs a control signal of the second switching unit based on a result of the comparison.

The ramp signal generating part may generate the ramp signal based on an output waveform of the transforming unit.

The ramp signal generating part may include: a capacitor which is charged by the first output current; and a switching element which selectively discharges the capacitor to provide the ramp signal.

The power circuit device may further include: a rectifying element which rectifies the second output current; and a smoothing element which smoothes an output of the rectifying element to provide the driving voltage of the backlight.

The second switching unit may be interposed between the rectifying element and the smoothing element.

The backlight driving unit may include: a transistor which is connected to the backlight; and a control element which controls the transistor so that a current flowing through the transistor can reach a predefined reference value.

According to an aspect of another exemplary embodiment, there is provided a display apparatus including: a signal receiving unit which receives an image signal; a signal processing unit which processes the image signal received by the signal receiving unit; a display unit which displays an image based on the image signal processed by the signal processing unit and includes a backlight for display of the image; and a power circuit unit which provides an operation voltage to the display unit, the power circuit unit including: a transforming part which outputs a first output current and a second output current in response to change of an input current; a first switching part which switches to allow the input current to be selectively input; a first switch control part which controls the first switching part so that an operation voltage of the display apparatus by the first output current can reach a first target value; a second switching part which switches to allow the second output current to be selectively output; a backlight driving part which drives the backlight based on the second output current; and a second switch control part which controls the second switching part so that a driving voltage of the backlight by the second output current can reach a second target value.

The transforming part may include: a primary coil which receives the input current; a secondary main coil which outputs the first output current; and a secondary auxiliary coil which outputs the second output current.

The second switch control part may control the second switching part to intercept the second output current before the second output current is fully discharged.

The second switch control part may include: an error amplifier which outputs an error signal which is a difference between a feedback signal of the driving voltage of the backlight and a predefined reference signal; a ramp signal generating portion which generates a ramp signal; and a comparing portion which compares the error signal with the ramp signal and outputs a control signal of the second switching part based on a result of the comparison.

The ramp signal generating portion may generate the ramp signal based on an output waveform of the transforming part.

The ramp signal generating portion may include: a capacitor which is charged by the first output current; and a switching element which selectively discharges the capacitor to provide the ramp signal.

The power circuit unit may further include: a rectifying element which rectifies the second output current; and a smoothing element which smoothes an output of the rectifying element to provide the driving voltage of the backlight.

The second switching part may be interposed between the rectifying element and the smoothing element.

The backlight driving part may include: a transistor which is connected to the backlight; and a control element which controls the transistor so that a current flowing through the transistor can reach a predefined reference value.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF THE EXEMPLARY EMBODIMENTS

Below, exemplary embodiments will be described in detail with reference to accompanying drawings. The inventive concept may be embodied in various forms without being limited to the exemplary embodiments set forth herein. Descriptions of well-known parts are omitted for clarity, and like reference numerals refer to like elements throughout.

Figure 1:
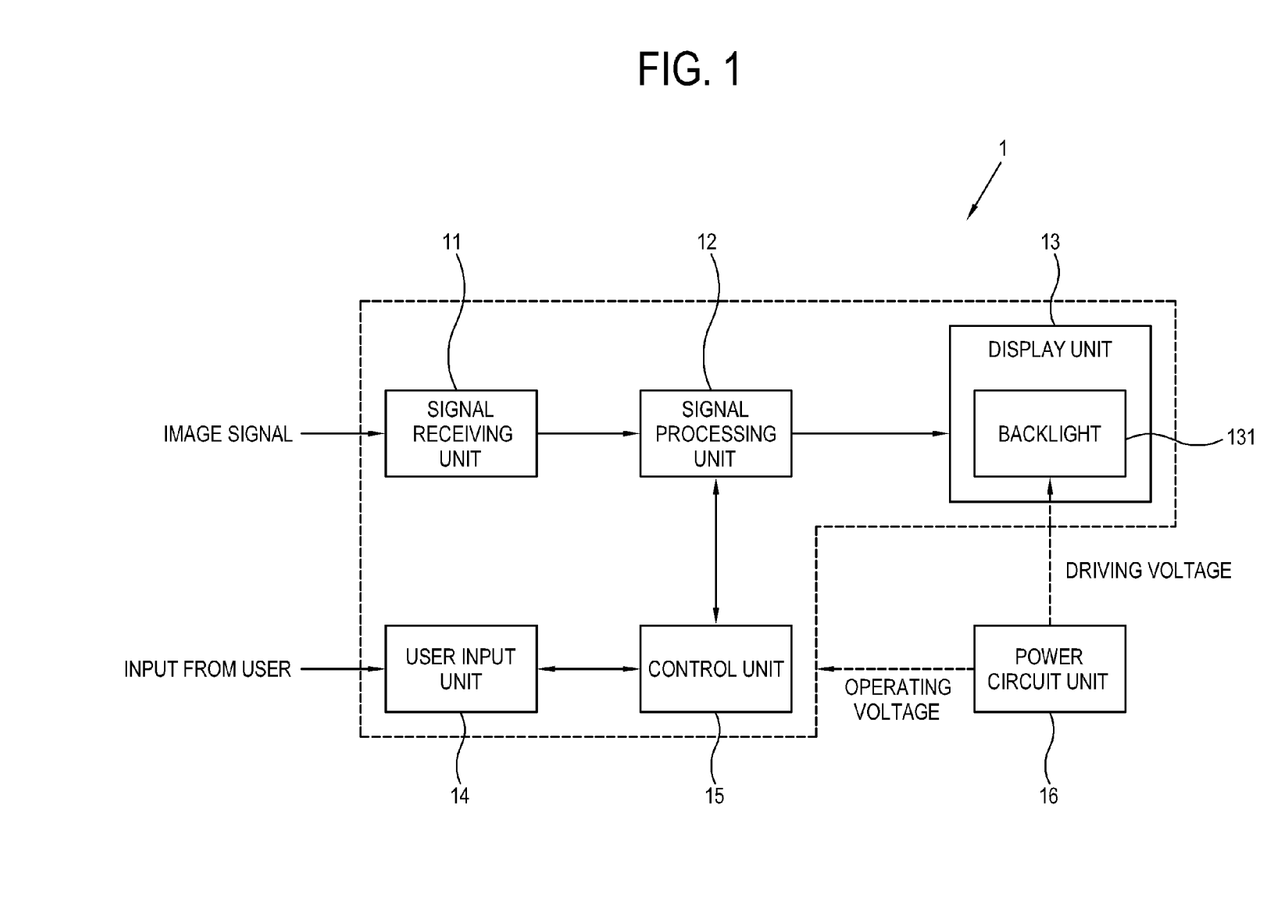
FIG. 1 is a block diagram showing a configuration of a display apparatus according to an exemplary embodiment.

FIG. 1 is a block diagram showing a configuration of a display apparatus 1 according to an exemplary embodiment. The display apparatus 1 may be implemented by a TV, a computer monitor or the like. The display apparatus 1 may include a signal receiving unit 11, a signal processing unit 12, a display unit 13, a user input unit 14 and a control unit 15.

The signal receiving unit 11 receives an image signal including an image. The image signal may include voice and/or data as well as image. The image signal received by the signal receiving unit 11 includes a broadcasting signal transmitted from a broadcasting station and a signal input from an imaging apparatus. For the broadcasting signal, the signal receiving unit 11 may selectively receive a broadcasting signal of at least one of a plurality of channels. The broadcasting signal includes all types of known broadcastings including ground wave broadcasting, cable broadcasting, satellite broadcasting signals, etc. In addition, the type of broadcasting signals includes digital and analog broadcasting signals. The signal receiving unit 11 may perform signal processing for obtaining an image and the like from the received broadcasting signal. Such signal processing includes tuning, analog to digital conversion, demodulation, digital to analog conversion, etc.

For the image signal input from the imaging apparatus, the signal receiving unit 11 may perform communication with the imaging apparatus which transmits the image signal in correspondence to characteristics of the input image signal. Such communication includes wired and/or wireless communications and analog and digital communications. In addition, a type of communication includes all types of communications available for transmission of images and so on. A type of the imaging apparatus for providing an image signal to the signal receiving unit 11 may include, but is not limited to, a digital video disk (DVD) player, a blu-ray (BD) player, a personal computer (PC), a mobile phone, a smart phone, a TV or any other imaging apparatus known in the art. The signal receiving unit 11 may also perform signal processing for obtaining an image and so on from the input image signal. Such signal processing includes analog to digital conversion, digital to analog conversion, etc.

Further, the signal receiving unit 11 may receive an image signal from a server via a network or receive an image from a movable storage such as a Universal Serial Bus (USB) memory device. In each case, the signal receiving unit 11 may perform communication with the external device according to a suitable communication protocol for receiving the image signal. In either case, the signal receiving unit 11 may perform operations of receiving and processing the image signal under control of the control unit 15.

The signal processing unit 12 performs image processing such that an image obtained from the image signal received by the signal receiving unit 11 can be displayed on the display unit 13. Such image processing includes demultiplexing, decoding, scaling, image quality adjustment, image quality enhancement, etc. In addition, the signal processing unit 12 may process an image related to a UI menu for interface with a user. The signal processing unit 12 may perform a process of overlapping or arranging in parallel at least portions of the image from the image signal and the image related to the UI menu.

The display unit 13 displays the image processed by the signal processing unit 12. As shown in FIG. 1, the display unit 13 includes a backlight 131 as a light source. The backlight 131 is a light emitting device and may include at least one LED. The display unit 13 may further include a display panel (not shown) of, for example, an liquid crystal display (LCD) type for displaying an image using light emitted from the backlight 131.

The user input unit 14 receives instructions from a user and may be implemented by a remote controller, an operation panel or the like.

The control unit 15 controls the entire operation of the display apparatus 1. The control unit 15 controls various components of the display apparatus 1 according to a user's instructions input through the user input unit 14. The control unit 15 may control the signal receiving unit 11 to receive an image signal desired by the user. In addition, the control unit 15 may control the signal processing unit 12 to perform image processing for the image obtained from the image signal received by the signal receiving unit 11 and/or the UI menu. The control unit 15 may store data required for such control in a storage unit (not shown) or read the stored data from the storage unit.

The control unit 15 may include a nonvolatile memory in which execution codes of a computer program for the above controls are embodied, a volatile memory in which at least some of the execution codes stored in the nonvolatile memory are loaded, and a microprocessor which executes the execution codes loaded in the volatile memory.

Figure 2:
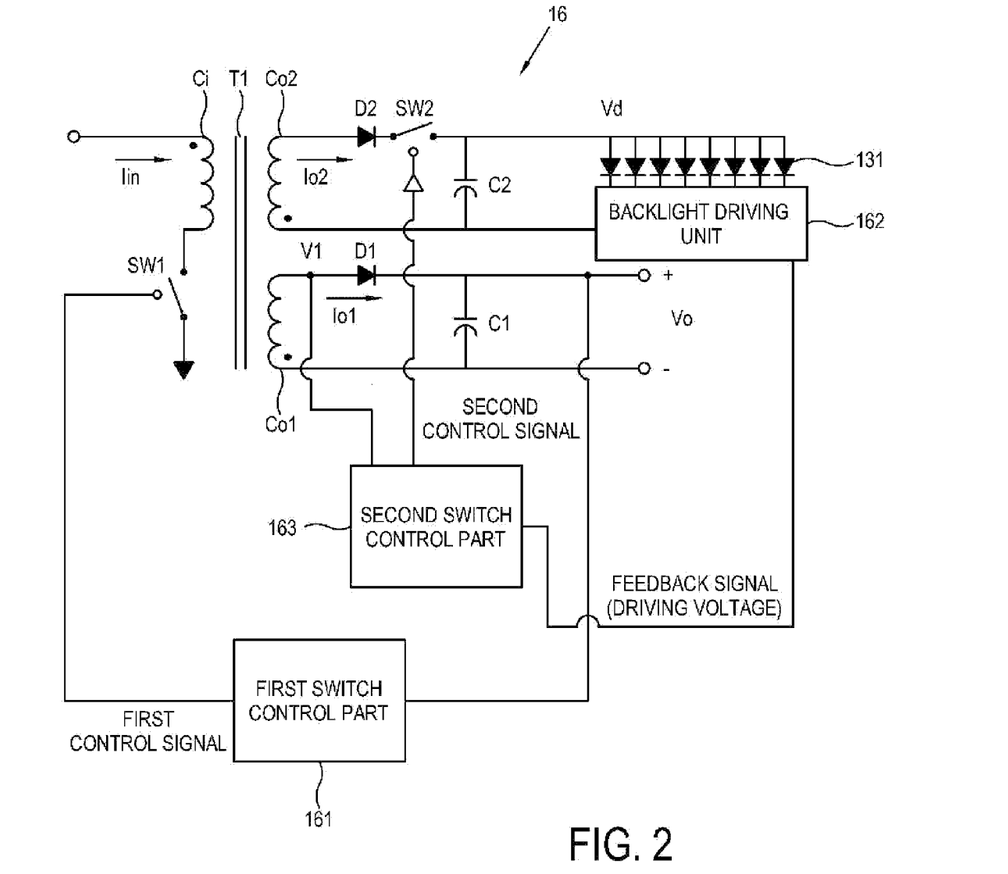
FIG. 2 is a circuit diagram showing the entire configuration of a power circuit unit shown in FIG. 1.

The display apparatus 1 further includes a power circuit unit 16 which supplies power to various components of the display apparatus 1 and drives the backlight 131. FIG. 2 is a circuit diagram showing the entire configuration of the power circuit unit 16 according to an exemplary embodiment. As shown in FIG. 2, the power circuit unit 16 may include a transforming part T1, a first switching part SW1, a first rectifying element D1, a first smoothing element C1, a first switch control part 161, a backlight driving part 162, a second switching part SW2, a second rectifying element D2, a second smoothing element C2 and a second switch control part 163.

The transforming part T1 includes a primary coil Ci at an input side and a secondary main coil Co1 and a secondary auxiliary coil Co2 at an output side. The first switching part SW1 is connected to the primary coil Ci and an input current Iin selectively flows through the primary coil Ci based on switching of the first switching part SW1. When the input current Iin is changed in the primary coil Ci, a voltage is induced in the secondary main coil Co1 and the secondary auxiliary coil Co2, to thereby flow a first output current Io1 and a second output current Io2, respectively.

The first output current Io1 flowing through the secondary main coil Co1 is rectified and filtered by the first rectifying element D1 and the first smoothing element C1, respectively, to thereby provide an operation voltage Vo. The operation voltage Vo is used as main power required for operation of various components of the display apparatus 1, such as the display unit 13 and so on. The first switch control part 161 monitors the operation voltage Vo and outputs a first control signal to control switching of the first switching part SW1 so that the operation voltage Vo can reach a predefined first target value. A pulse width modulation (PWM) control mode may be used for control of the first switching part SW1 by the first switch control part 161.

Figure 3:
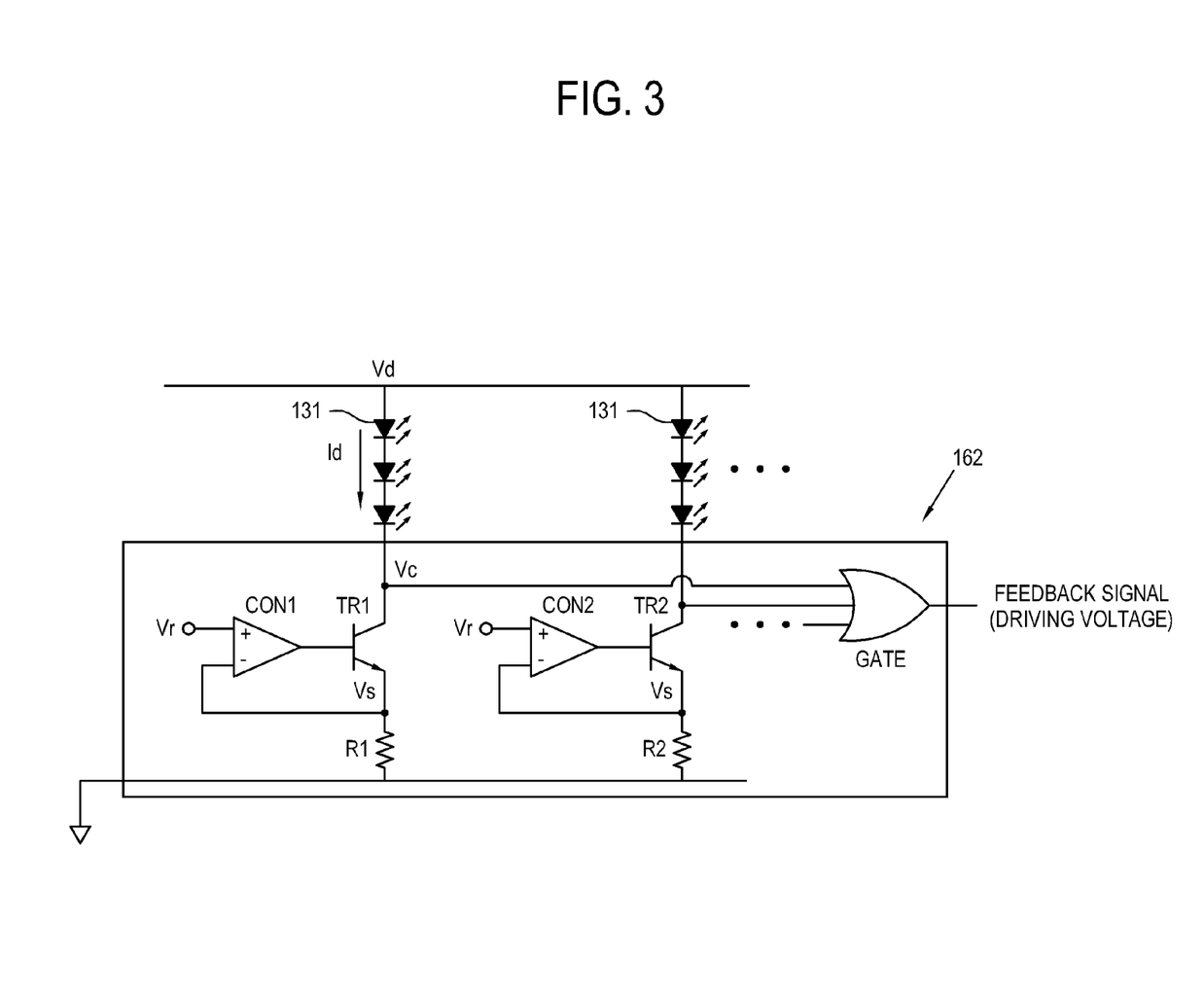
FIG. 3 is a circuit diagram showing the entire configuration of a backlight driving part shown in FIG. 2.

The second output current Io2 flowing through the secondary auxiliary coil Co2 is rectified and filtered by the second rectifying element D2 and the second smoothing element C2, respectively, to thereby provide a driving voltage Vd. The driving voltage Vd is used as power required to drive the backlight 131. The backlight driving part 162 drives the backlight 131 based on the driving voltage Vd. FIG. 3 is a circuit diagram showing a detailed configuration of the backlight driving part 162. It is assumed in FIG. 3 that the backlight 131 is configured to include a plurality of LED modules, each of which includes a plurality of LEDs connected in series.

The backlight driving part 162 may include transistors TR1, TR2, . . . , resistors R1, R2, . . . , and control elements CON1, CON2, . . . , for each LED module 131 and may further include a gate element GATE which outputs a feedback signal of the driving voltage Vd. Each control element CON1, CON2, . . . , compares a voltage Vs across a corresponding resistor R1, R2, . . . , with a preset reference voltage Vr and controls a corresponding transistor TR1, TR2, . . . , based on a result of the comparison, so that a current Id flowing in a corresponding LED module 131 can reach a predefined target value. The gate element GATE performs an AND operation for voltages Vc across collectors of the transistors TR1, TR2, . . . , of each LED module 131 and outputs the feedback signal of the driving voltage Vd.

Figure 4:
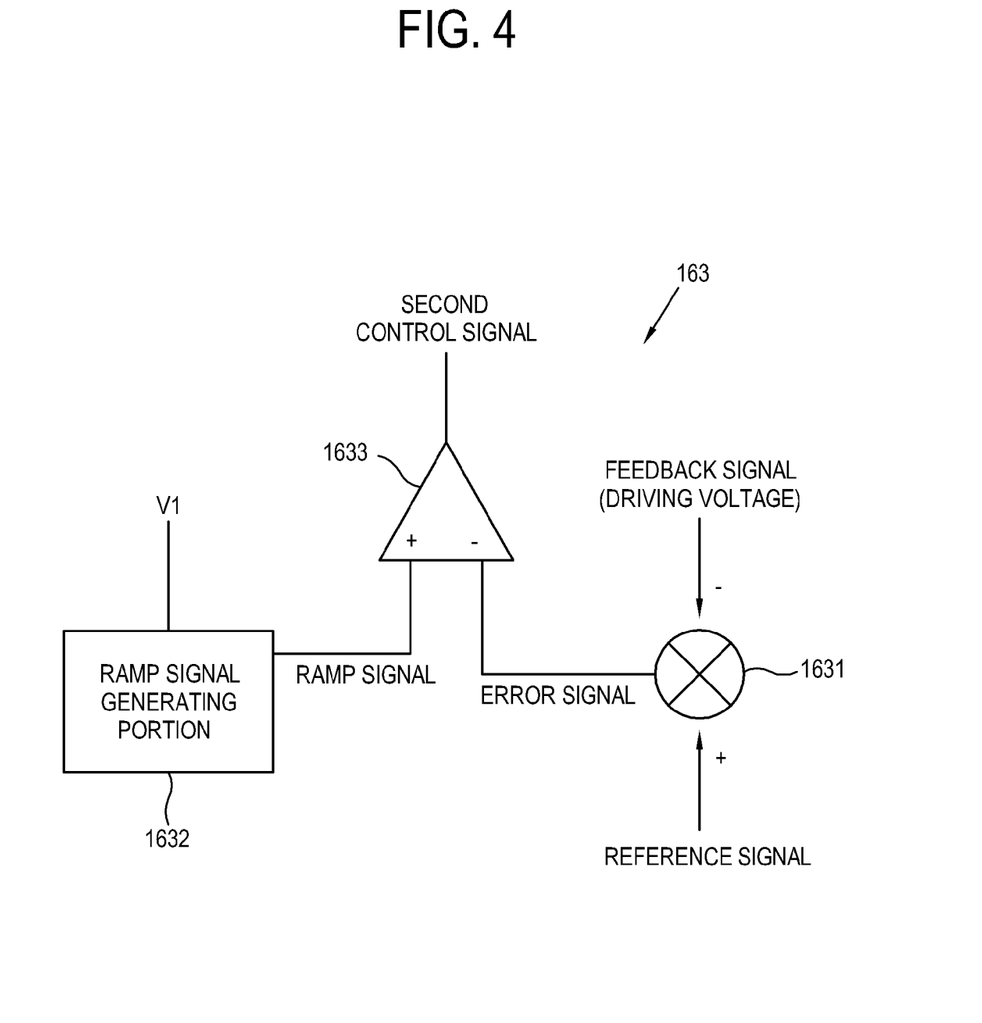
FIG. 4 is a circuit diagram showing a detailed configuration of a second switch control part shown in FIG. 2.

The second switching SW2 is interposed between the second rectifying element D2 and the second smoothing element C2 at a second auxiliary coil Co2 side and is switched such that the second output current Io2 can selectively flows. Based on the feedback signal of the driving voltage Vd output from the backlight driving part 162, the second switch control part 163 outputs a second control signal to control switching of the second switching part SW2 so that the driving voltage Vd can reach a predefined second target value. FIG. 4 is a circuit diagram showing a detailed configuration of the second switch control part 163.

Figure 5:
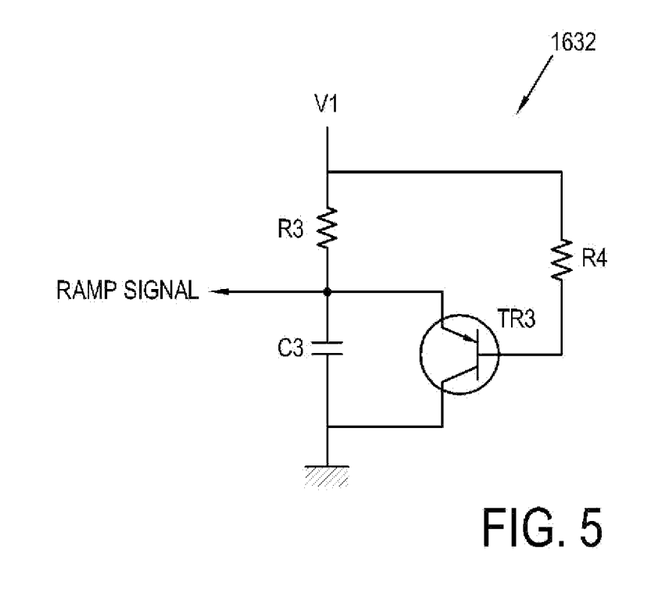
FIG. 5 is a circuit diagram showing a detailed configuration of a ramp signal generating portion shown in FIG. 4.

The second switch control part 163 may include an error amplifier (AMP) 1631, a ramp signal generating portion 1632 and a comparing portion 1633. The error AMP 1631 receives the feedback signal of the driving voltage Vd output from the backlight driving part 162 and the predefined reference signal and outputs an error signal corresponding to a difference therebetween. The ramp signal generating portion 1632 outputs a ramp signal whose ramp-like waveform is repeated at a predetermined period (see a "ramp signal" in FIG. 6). The comparing portion 1633 compares the error signal output from the error AMP 1631 with the ramp signal output from the ramp signal generating portion 1632 and outputs a resultant second control signal to the second switching part SW2. FIG. 5 is a circuit diagram showing a detailed configuration of the ramp signal generating portion 1632.

As shown in FIG. 5, the ramp signal generating portion 1632 may include a third resistor R3, a fourth resistor R4, a third capacitor C3 and a third transistor TR3. The third resistor R3 and the third capacitor C3 are connected in series and one end of the third resistor R3 is connected to an output voltage stage (see reference number "V1" in FIG. 2) of the secondary main coil Co1. The third transistor TR3 is connected to both ends of the third capacitor C3 and the fourth resistor R4 is connected between the output voltage stage V1 of the secondary main coil Co1 and a base of the third transistor TR3. The third capacitor C3 is charged if the third transistor TR3 is turned off, while the third capacitor C3 is discharged if the third transistor TR3 is turned on. The ramp signal is output at a junction point between the third resistor R3 and the third capacitor C3. The ramp signal is slowly increased while the third capacitor C3 is being charged, and quickly approaches to zero when the third capacitor C3 is discharged. Since the ramp signal generating portion 1632 uses the output voltage V1 of the secondary main coil Co1 to produce the ramp signal, the circuit can be efficiently configured.

Figure 6:
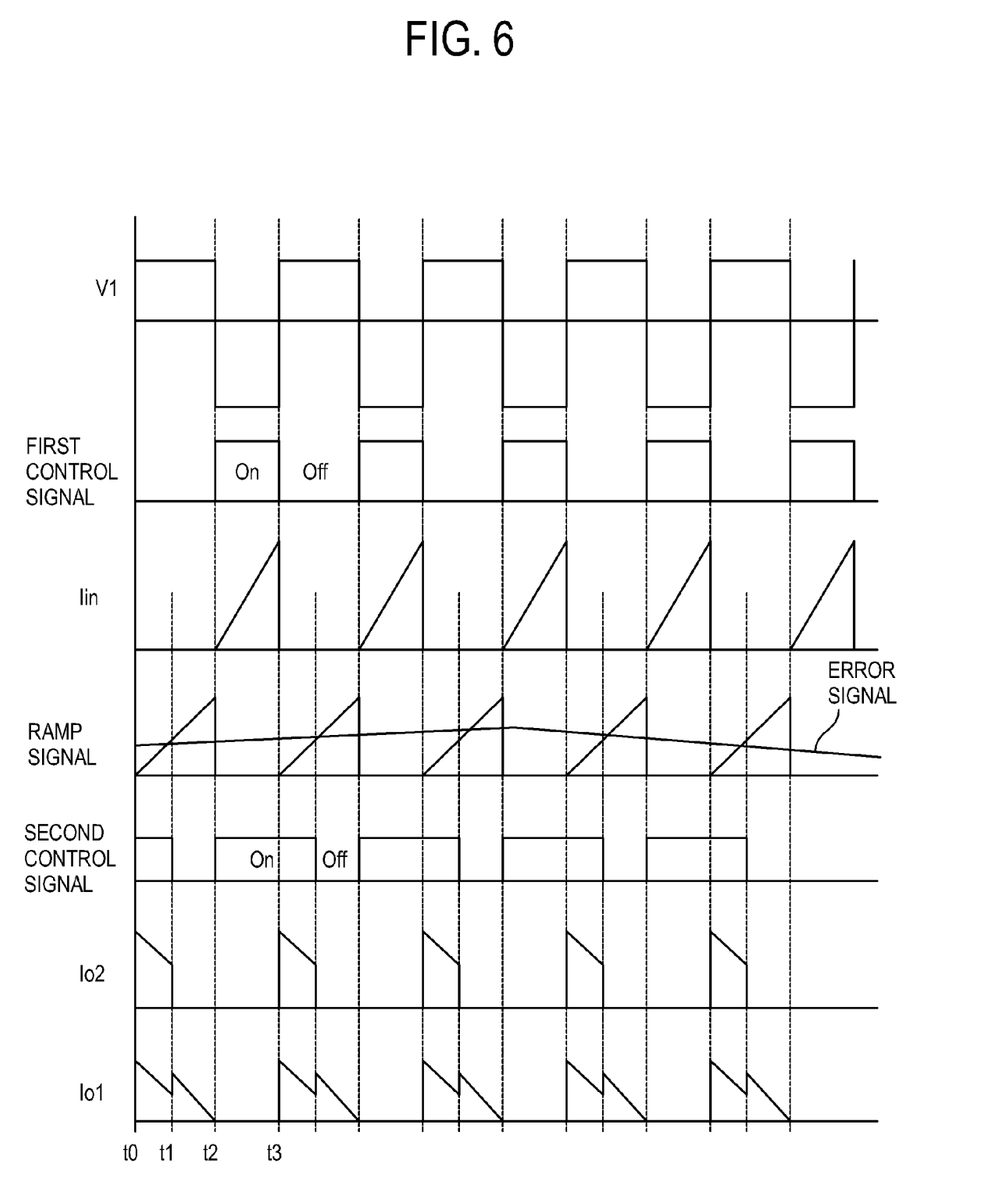
FIG. 6 is a waveform diagram of signals in the power circuit units shown in FIGS. 1 to 5.

FIG. 6 is a waveform diagram of signals in the power circuit units 16 shown in FIGS. 1 to 5. Referring to FIG. 6, the first switching part SW1 alternates between "turning-on" and "turning-off" according to the first control signal of the first switch control part 161 which alternates between logic HIGH and logic LOW with a predetermined duty ratio. In response to this, the input current Iin flowing through the primary coil Ci of the transforming part T1 increases when the first switching part SW1 is turned on, while the input current Iin does not flow when the first switching part SW1 is turned off. In response to this, the output voltage V1 of the secondary main coil Co1 of the transforming part T1 has a shape of square wave. The ramp signal output from the ramp signal generating portion 1632 has a ramp-like waveform corresponding to the output voltage V1.

If the input current Iin flowing through the primary coil Ci stops as the first switching part SW1 is turned off (after a point t0), the first output current Io1 and the second output current Io2 are induced in the secondary main coil Co1 and the secondary auxiliary coil Co2, respectively. The first output current Io1 and the second output current Io2 decrease with lapse of time. At this time, the second control signal output from the second switch control unit 163 goes to logic HIGH in an interval where the ramp signal is smaller than the error signal (from the point t0 to a point t1). Thus, the second switching part SW2 is turned on to allow the second output current Io2 to flow through the secondary auxiliary coil Co2.

Subsequently, when the ramp signal further increases over the error signal (after the point t1), the second control signal output from the second switch control part 163 goes to logic LOW. Thus, the second switching part SW2 is turned off to prevent the second output current Io2 from flowing through the secondary auxiliary coil Co2. Since the secondary main coil Co1 and the secondary auxiliary coil Co2 have a complementary relationship, energy induced in the secondary auxiliary coil Co2 is delivered to the secondary main coil Co1 as the second output current Io2 does not flow. Accordingly, the first output current Io1 temporarily increases (at the point t1). Thereafter, the first output current Io1 decreases again with lapse of time (from the point t1 to the point t2).

When the first output current Io1 fully decreases (at the point t2), the first control signal of the first switch control part 161 goes to logic HIGH. Thus, the first switching part SW is turned on and the input current Iin begins to flow through the primary coil Ci (from the point t2 to a point t3). In this interval, none of the first output current Io1 and the second output current Io2 flows. In the meanwhile, the output voltage V1 of the secondary main coil Co1 is inverted and the ramp signal becomes zero. In an interval where the ramp signal is smaller than the error signal (from the point t2 to a point t3), the second control signal output from the second switch control part 163 goes to logic HIGH and the second switching part SW2 is turned on. When the first control signal of the first switch control part 161 goes to logic LOW again (after the point t3) to stop the flow of the input current Iin through the primary coil Ci, the first output current Io1 and the second output current Io2 begin to flow through the secondary main coil Co1 and the secondary auxiliary coil Co2, respectively. In this manner, the waveforms of the first output current Io1 and the second output current Io2 from the point t0 to the point t3 are subsequently repeated.

As shown in FIG. 6, as the second switching part SW2 is interposed between the second rectifying element D2 and the second smoothing element C2 and the flow of the second output current Io2 is intercepted before being fully discharged (at the point t1), the second switch control part 163 regulates the driving voltage Vd used to drive the backlight 132. In this case, the second rectifying element D2 and the second smoothing element C2 are used to regulate the driving voltage Vd. On the other hand, the second rectifying element D2 and the second smoothing element C2 may be provided as elements of a flyback-type converter at the secondary auxiliary coil Co2. In this manner, with the power circuit unit 16 according to an exemplary embodiment, by utilizing the second rectifying element D2 and the second smoothing element C2 constructing the converter to regulate the driving voltage Vd, a separate component such as a post-regulator can be removed, which may result in reduced production costs.

In addition, when the second output current Io2 flowing through the secondary auxiliary coil Co2 is intercepted, the current or energy in the secondary auxiliary coil Co2 moves to the secondary main coil Co1, which may result in increase in energy efficiency.

As described above, the power circuit unit 16 may be implemented to be incorporated into or separated from the display apparatus 1.

According to the above-described exemplary embodiments, it is possible to reduce costs and increase efficiency by removing a post-regulator from a power circuit of a display apparatus including a backlight.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A power circuit device which drives a backlight included in a display apparatus, comprising:
    a transforming unit which comprises
        a primary coil which receives an input current,
        a secondary main coil which outputs a first output current and
        a secondary auxiliary coil which outputs a second output current;
    a first switching unit which switches to allow the input current to be selectively input;
    a first switch control unit which controls the first switching unit so that an operation voltage of the display apparatus reaches a first target value;
    a second switching unit which switches to allow the second output current to be selectively output;
    a backlight driving unit which drives the backlight based on the second output current; and
    a second switch control unit which controls the second switching unit so that a driving voltage of the backlight reaches a second target value and that the second switching unit is turned on or off at a timing corresponding to change in an output voltage of the secondary main coil.

2. The power circuit device according to claim 1, wherein the second switch control unit controls the second switching unit to intercept the second output current before the second output current is fully discharged.

3. The power circuit device according to claim 1, wherein the second switch control unit comprises:
    an error amplifier which outputs an error signal which is a difference between a feedback signal of the driving voltage of the backlight and a predefined reference signal;
    a ramp signal generating part which generates a ramp signal; and
    a comparing part which compares the error signal with the ramp signal and outputs a control signal of the second switching unit based on a result of the comparing.

4. The power circuit device according to claim 3, wherein the ramp signal generating part generates the ramp signal based on an output waveform of the transforming unit.

5. The power circuit device according to claim 4, wherein the ramp signal generating part comprises:
    a capacitor which is charged by the first output current; and
    a switching element which selectively discharges the capacitor to provide the ramp signal.

6. The power circuit device according to claim 1, further comprising:
    a rectifying element which rectifies the second output current; and
    a smoothing element which smoothes an output of the rectifying element to provide the driving voltage of the backlight.

7. The power circuit device according to claim 6, wherein the second switching unit is interposed between the rectifying element and the smoothing element.

8. The power circuit device according to claim 1, wherein the backlight driving unit comprises:
    a transistor which is connected to the backlight; and
    a control element which controls the transistor so that a current flowing through the transistor reaches a predefined reference value.

9. A display apparatus comprising:
a signal receiving unit which receives an image signal;
a signal processing unit which processes the image signal received by the signal receiving unit;
a display unit which displays an image based on the image signal processed by the signal processing unit; and
a power circuit unit which provides an operation voltage to the display unit, comprising:
a transforming unit which comprises
a primary coil which receives an input current,
a secondary main coil which outputs a first output current and
a secondary auxiliary coil which outputs a second output current;
a first switching unit which switches to allow the input current to be selectively input;
a first switch control unit which controls the first switching unit so that an operation voltage of the display apparatus reaches a first target value;
a second switching unit which switches to allow the second output current to be selectively output;
a backlight driving unit which drives the backlight based on the second output current; and
a second switch control unit which controls the second switching unit so that a driving voltage of the backlight reaches a second target value and that the second switching unit is turned on or off at a timing corresponding to a change in an output voltage of the secondary main coil,
wherein the display unit comprises a backlight for display of the image.

10. The display apparatus according to claim 9, wherein the second switch control part controls the second switching part to intercept the second output current before the second output current is fully discharged.

11. The display apparatus according to claim 9, wherein the second switch control part comprises:
an error amplifier which outputs an error signal which is a difference between a feedback signal of the driving voltage of the backlight and a predefined reference signal;
a ramp signal generating portion which generates a ramp signal; and
a comparing portion which compares the error signal with the ramp signal and outputs a control signal of the second switching part based on a result of the comparing.

12. The display apparatus according to claim 11, wherein the ramp signal generating portion generates the ramp signal based on an output waveform of the transforming part.

13. The display apparatus according to claim 12, wherein the ramp signal generating portion comprises:
a capacitor which is charged by the first output current; and
a switching element which selectively discharges the capacitor to provide the ramp signal.

14. The display apparatus according to claim 9, wherein the power circuit unit further comprises:
a rectifying element which rectifies the second output current; and
a smoothing element which smoothes an output of the rectifying element to provide the driving voltage of the backlight.

15. The display apparatus according to claim 14, wherein the second switching part is interposed between the rectifying element and the smoothing element.

16. The display apparatus according to claim 9, wherein the backlight driving part comprises:
a transistor which is connected to the backlight; and
a control element which controls the transistor so that a current flowing through the transistor can reach a predefined reference value.

* * * * *